United States Patent
McCoy, Jr.

(10) Patent No.: US 7,466,099 B2
(45) Date of Patent: Dec. 16, 2008

(54) MULTI-MODE MANIPULATOR ARM AND DRIVE SYSTEM

(75) Inventor: Richard W. McCoy, Jr., Cypress, TX (US)

(73) Assignee: Oceaneering International, Inc., Houston, TX (US)

( * ) Notice: Subject to any disclaimer, the term of this patent is extended or adjusted under 35 U.S.C. 154(b) by 144 days.

(21) Appl. No.: 11/675,681

(22) Filed: Feb. 16, 2007

(65) Prior Publication Data

US 2007/0205739 A1 Sep. 6, 2007

Related U.S. Application Data

(60) Provisional application No. 60/774,782, filed on Feb. 17, 2006.

(51) Int. Cl.
  *G05B 19/18* (2006.01)

(52) U.S. Cl. ............... 318/568.1; 318/568.11; 318/568.13; 318/568.14; 318/568.17; 901/2; 700/245; 700/249; 700/90; 700/260

(58) Field of Classification Search ............. 318/568.1, 318/568.11, 568.13, 568.14, 568.17; 700/245, 700/249, 260, 90; 901/2
See application file for complete search history.

(56) References Cited

U.S. PATENT DOCUMENTS

| | | | |
|---|---|---|---|
| 4,068,156 A | 1/1978 | Johnson et al. | |
| 4,467,436 A | 8/1984 | Chance | |
| 4,486,843 A | 12/1984 | Spongh et al. | |
| 4,608,651 A * | 8/1986 | Murakami et al. | 700/250 |
| 4,642,781 A | 2/1987 | Szonyi | |
| 4,685,067 A | 8/1987 | French et al. | |
| 4,786,848 A * | 11/1988 | Nickerson | 318/577 |
| 5,038,089 A * | 8/1991 | Szakaly | 701/23 |
| 5,046,022 A | 9/1991 | Conway et al. | |
| 5,164,151 A | 11/1992 | Shah et al. | |
| 5,223,776 A | 6/1993 | Radke et al. | |
| 5,224,033 A | 6/1993 | Nakamura et al. | |
| 5,429,682 A | 7/1995 | Harlow, Jr. et al. | |
| 5,645,884 A | 7/1997 | Harlow, Jr. et al. | |
| 5,734,373 A * | 3/1998 | Rosenberg et al. | 345/161 |
| 5,760,764 A * | 6/1998 | Martinelli | 345/160 |
| 5,825,308 A * | 10/1998 | Rosenberg | 341/20 |
| 6,167,831 B1 | 1/2001 | Watt et al. | |
| 6,204,620 B1 | 3/2001 | McGee et al. | |
| 6,313,595 B2 | 11/2001 | Swanson et al. | |
| 6,456,901 B1 | 9/2002 | Xi et al. | |
| 6,772,705 B2 * | 8/2004 | Leonard et al. | 114/333 |
| 7,327,348 B2 * | 2/2008 | Goldenberg et al. | 345/156 |

OTHER PUBLICATIONS

DND Kottege, "Virtual Robot Arm Control Model," Department of Physics, Univ. of Colombo, Sri Lanka, Jun. 2003, 1-12.

M. Borland, et al., "The Integration of an Electro-hydraulic Manipulator Arm into a Self-Contained Mobile Delivery System," 8th International Topical Meeting on Robotics and Remote Systems, Apr. 25-29, 1999, 1-12.

(Continued)

*Primary Examiner*—Rita Leykin
(74) *Attorney, Agent, or Firm*—Duane Morris LLP

(57) ABSTRACT

The present invention relates to a manipulator arm and drive system that can be operated in multiple modes, including an on or off mode, referred to herein as a "rate mode" or a spatially correspondent ("SC") mode. The multi-mode manipulator arm and drive system of the present invention can be hydraulically operated subsea.

20 Claims, 5 Drawing Sheets

OTHER PUBLICATIONS

David Smallwood, et al., "A New Remotely Operated Underwater Vehicle for Dynamics and Control Research," 11th International Symposium on Unmanned Untethered Submersible Technology, Durham, NH, Sep. 19-22, 1999, 8pps.

Jee-Hwan Ryu, et al., "Control of Underwater Manipulators Mounted on an ROV Using Base Force Information," International Conference on Robotics & Automation, Seoul, Korea, May 21-26, 2001, 3238-3243.

Michael Valenti, "Teaching Rover New Tricks," Mechanical Engineering, http://www.memagazine.org/backissues/membersonly/may02/features/rover/rover.html., May 2002, 11pps.

Dong-Soo Kwon, et al., "Design of a Teleoperation Controller for an Underwater Manipulator," International Conference on Robotics & Automation, San Francisco, CA, Apr. 2000, 3114-3119.

Shilling Sub-Atlantic Alliance, Shilling Robotics, "The RigMaster;" 2005, 4pps.

Thomas Debus, et al., "Cooperative Human and Machine Perception in Teleoperated Assembly," Experimental Robotics VII., The Fifth International Symposium Honolulu, HI, Dec. 10-13, 2000, 10 pps.

\* cited by examiner (PRIOR ART) FIG. 1

MULTI-MODE MANIPULATOR ARM AND DRIVE SYSTEM

CROSS REFERENCE TO RELATED APPLICATION

This application claims the benefit of U.S. Provisional Application No. 60/774,782, filed Feb. 17, 2006.

BACKGROUND OF THE INVENTION

1. Field of the Invention

The present invention relates to a manipulator arm and drive system that can be operated in multiple modes, including an on or off mode, referred to herein as a "rate mode" or a spatially correspondent ("SC") mode. The multi-mode manipulator arm and drive system of the present invention can be hydraulically operated subsea.

2. Description of the Prior Art

Prior art manipulator arms are available in two alternate primary modes (types), rate mode and spatially correspondent ("SC") mode manipulators. In rate mode, each of the manipulator degrees-of-freedom (DOF) is controlled by an actuator which in turn is controlled via a directional control valve that is either fully on or fully off. While the term "rate mode" is familiar to those skilled in the manipulator arm art, it does not provide a literal description of the functional capabilities of this mode. In prior art rate mode, the manipulator joint is either moving at full speed or it is completely stopped. In prior art rate mode, the rate of movement of the manipulator arm is not controlled. It would be advantageous to have a single manipulator that could be selectively operated in either of these modes.

In rate mode operation, the rate mode controller allows simple, on/off control of one or more actuator control channels. This further causes actuation of the appropriate actuator which, in turn causes movement of the appropriate arm joint or segment. The operator may actuate more than one actuator at a time. The operator is not in control of the velocity of the joint or segment since it is simply an "on/off" function. In rate mode, joint position feedback is not present. The operator simply actuates the desired joint or segment until he sees that it is the desired position/orientation.

A rate mode manipulator arm and drive system suitable for subsea applications is shown in FIG. 1. The rate mode manipulator shown in FIG. 1 is suitable for use with a manipulator having a single degree of freedom. In rate mode, the operator energizes a directional control valve by depressing individual buttons or button in order to move the directional control valve, and hence the actuator, in the desired direction. Rate mode manipulators operate in an "open-loop" fashion wherein the operator depresses the corresponding button or buttons until the manipulator joint or joints move into the desired position. The operator monitors the position of the manipulator visually. In subsea applications using an ROV, this may be accomplished via a subsea camera. There is no position feedback signal utilized in the manipulator control electronics itself.

Rate mode provides a more awkward method of controlling a manipulator arm than SC mode; however, rate mode manipulation is simpler and less costly to implement than SC mode manipulation. A rate mode manipulator is also more reliable than an SC mode manipulator because it requires less electronics than an SC mode manipulator.

In the SC mode (also known as "position controlled mode"), the position of each manipulator arm joint is known and controlled. Typically, an SC manipulator system comprises two parts: a master and a slave. The master is an input device, often embodied in a hand controller that is equipped with a number of joints whose angular position is measured and monitored as the operator moves the controller. Generally, the master has a joint arrangement that mimics the joint arrangement of the slave.

The slave is the manipulator itself. The manipulator is a tele-robotic arm. The slave will move in proportion to the master hand controller. If a joint on the master is moved slowly, the slave joint will move slowly. If the master is moved quickly, the slave will move quickly. The movement (velocity) of the slave joints and segments "correspond" to the movement of the "master" controller joints and segments. An SC mode manipulator arm and drive system is shown in FIG. 2.

Positions or changes-in-position of the master's joints and segments is monitored by a local control computer. The local control computer sends the appropriate signals to the remote control computer in response to master controller inputs. The remote control computer monitors the position of the arm joints and segments and compares those positions with the position information sent from the local control computer. It then performs the necessary calculations to determine the direction and magnitude of the signals required from the actuator control in order to move the actuators, and hence the arm joints and segments, to the right position.

Prior art SC manipulators operate in "closed-loop" mode, which uses an error signal that represents the position of each and every joint on the slave. This signal is continuously compared to the desired joint position (as indicated by the position of the master's matching joint) and the direction and magnitude of the corresponding control valve is modulated as necessary according to some sort of algorithm which is usually a variant of a proportional, integral, derivative (PID) loop.

In existing manipulator or robotic arm designs, the angular displacement of one or more joints is monitored with a resolver, potentiometer, or other rotation sensor. These require some sort of mechanical connection, typically a shaft, between the moveable portion of the joint and the sensor. Sensors are typically held stationary by the non-moveable portion of the joint. In a subsea environment, mechanical connection, e.g. a shaft, must be equipped with a mechanical connection seal to prevent seawater intrusion into the sensor. This mechanical connection seal is prone to failure, thus resulting in the subsequent failure of the sensor.

Existing solutions require discrete wiring for each sensor installed. Arms with large numbers of joint sensors require considerable wiring that can be difficult to install and maintain.

Existing sensor types often require that some sort of host controller read analog values that are produced by the sensor, e.g. a resolver or potentiometer. This requires that the controller provide processing power to read, filter, and scale the readings of each of the sensors which have had to transmit analog signals over long, noise-prone conductors.

Prior art SC mode manipulator systems have several problems. Each joint of the slave must be equipped with a position feedback device such as an encoder, resolver, or potentiometer. The control algorithm must have a reliable signal from this device in order for the manipulator to work. If any of the feedback devices fail, then the manipulator is unusable.

The velocity and acceleration of the slave joints must be variable and, preferably, stepless. Traditionally, this has been achieved by using hydraulic servo valves which suffer four disadvantages, which are high cost, propensity for failure due to lack of fluid cleanliness, high leakage rate, and high pressure drop at high flow rates. In order to increase the longevity of the SC manipulator, an isolated hydraulic power unit (HPU) is often required. This adds to the cost, weight and complexity of the system.

SC mode manipulators are easier than rate mode manipulators to operate. They also provide the operator with a fluid touch. An SC mode manipulator requires more responsive valves and electronics than a rate mode manipulator. This results in increased complexity and reduced reliability for an SC mode manipulator versus a rate mode manipulator.

DESCRIPTION OF THE PREFERRED EMBODIMENTS

Figure 1:
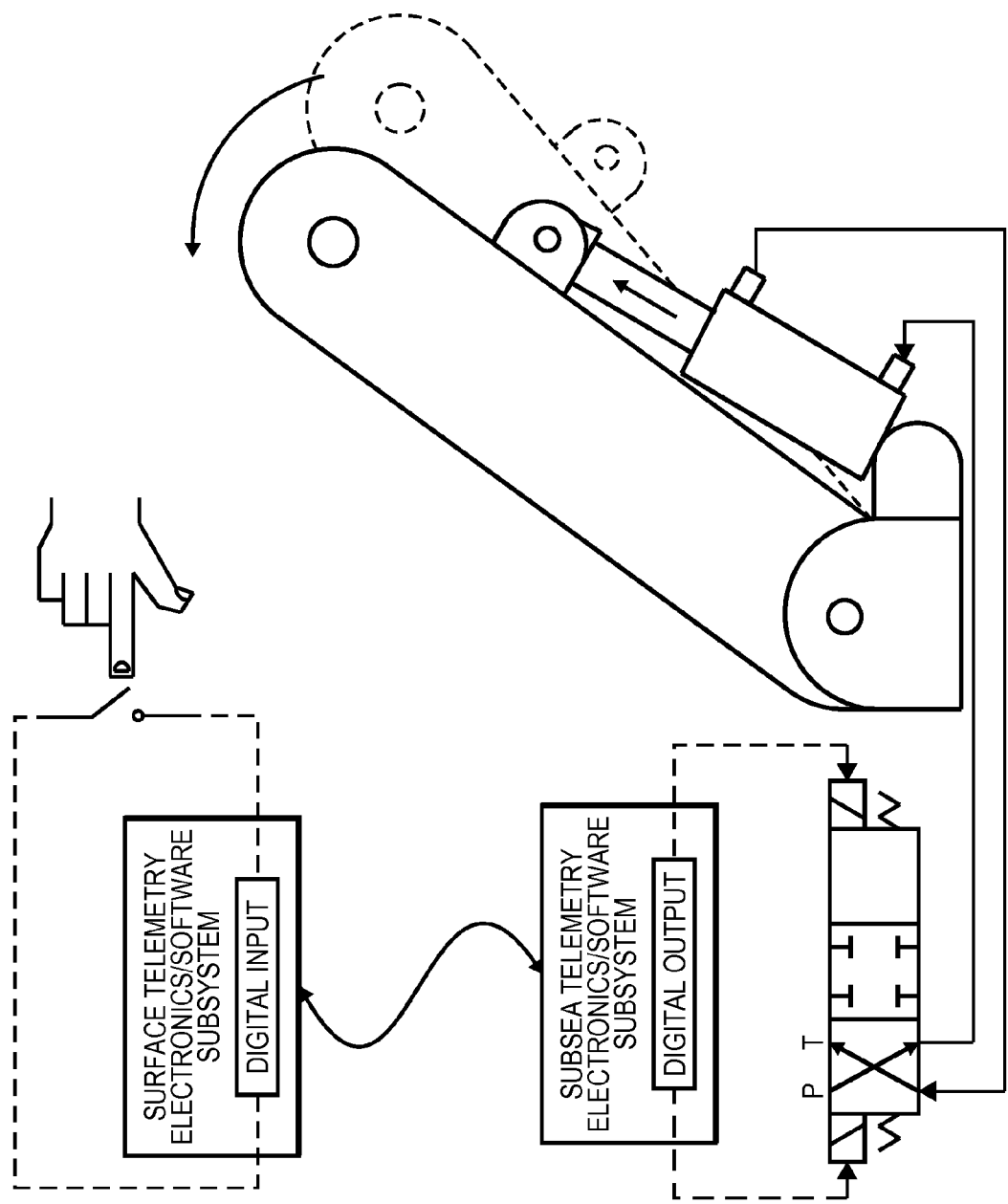
FIG. 1 depicts a rate mode manipulator and drive system of the prior art.
Figure 2:
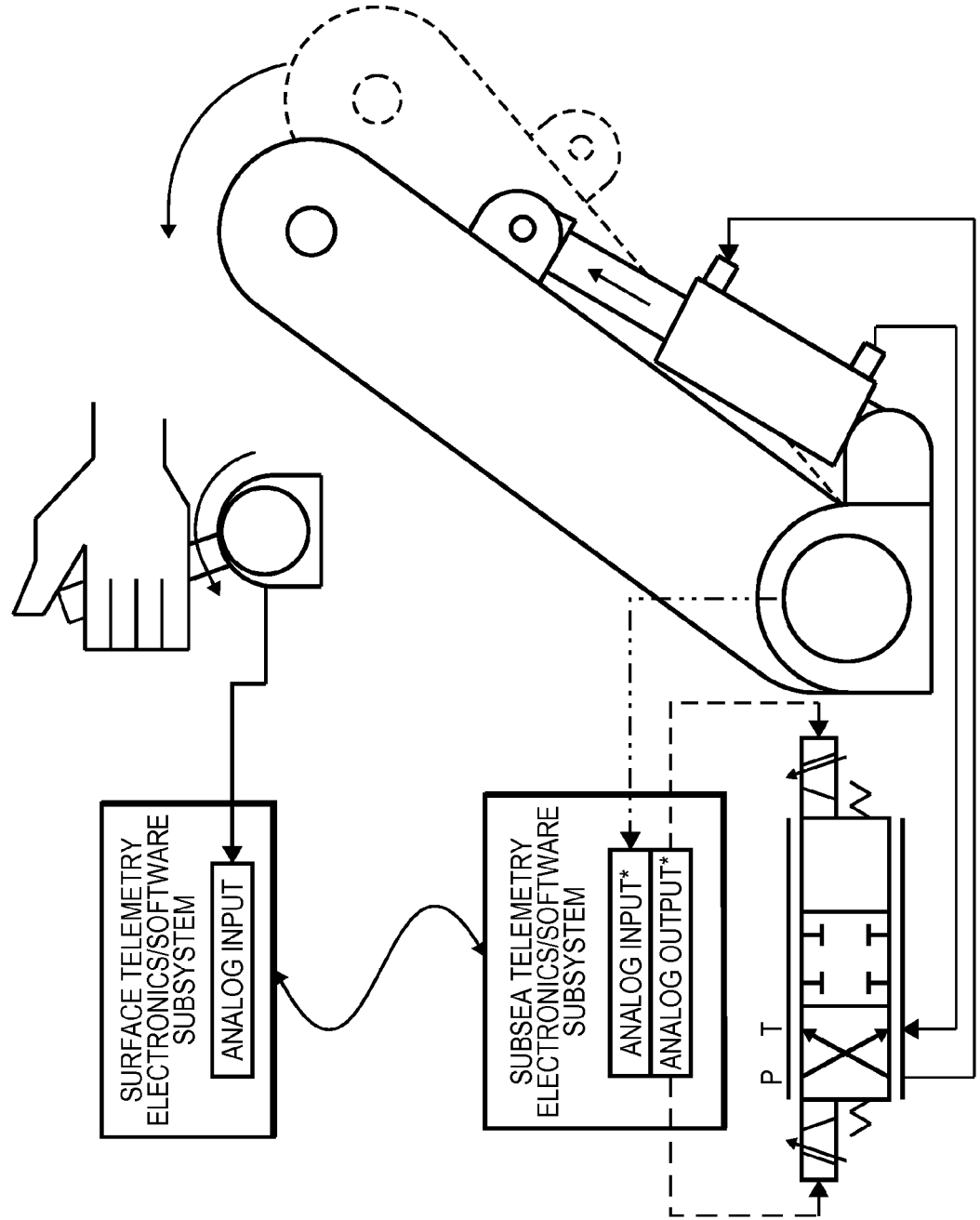
FIG. 2 depicts an SC rate mode manipulator and drive system of the prior art.
Figure 3:
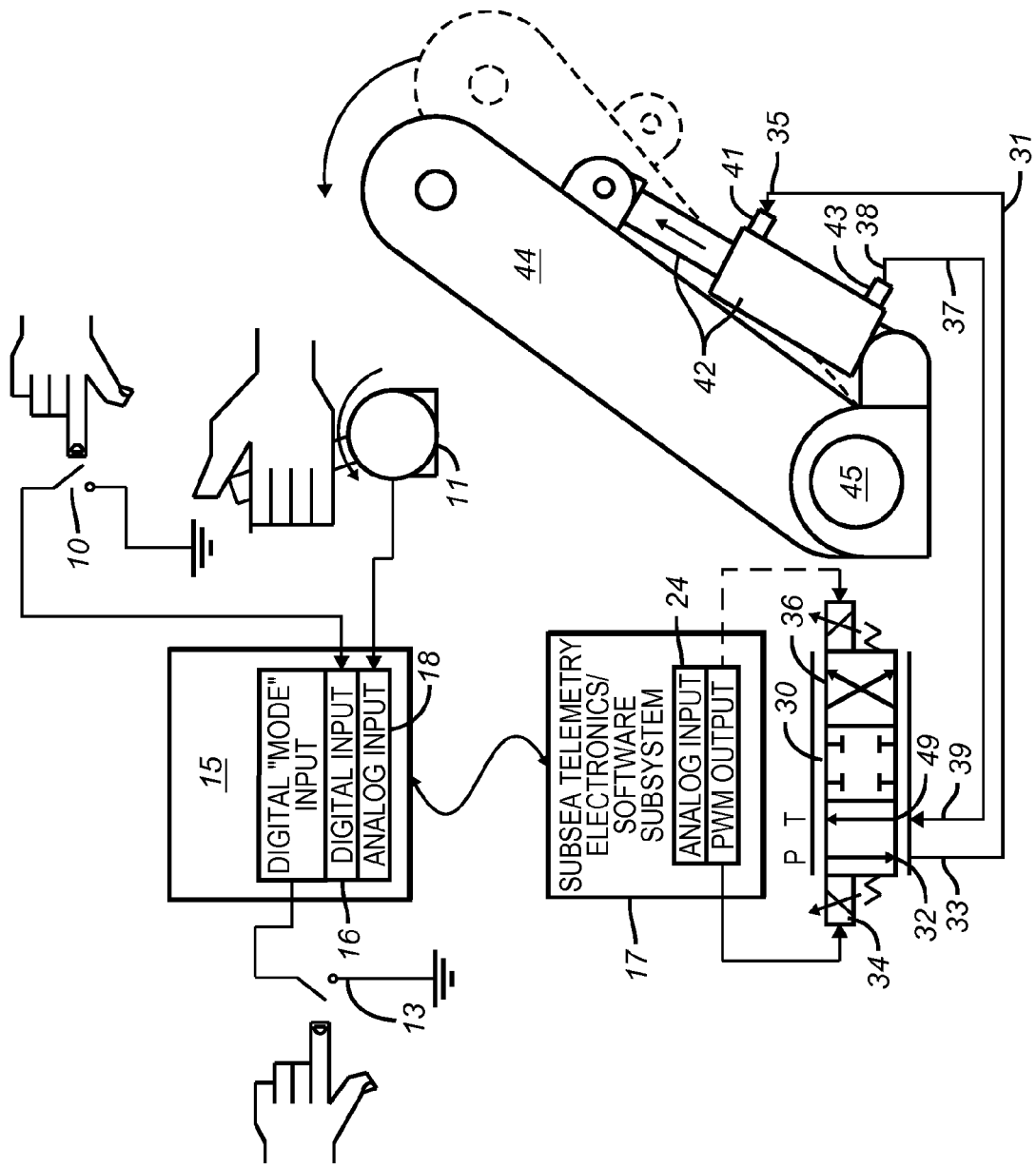
FIG. 3 is a system level diagram of a first preferred embodiment of the invention.
Figure 4A:
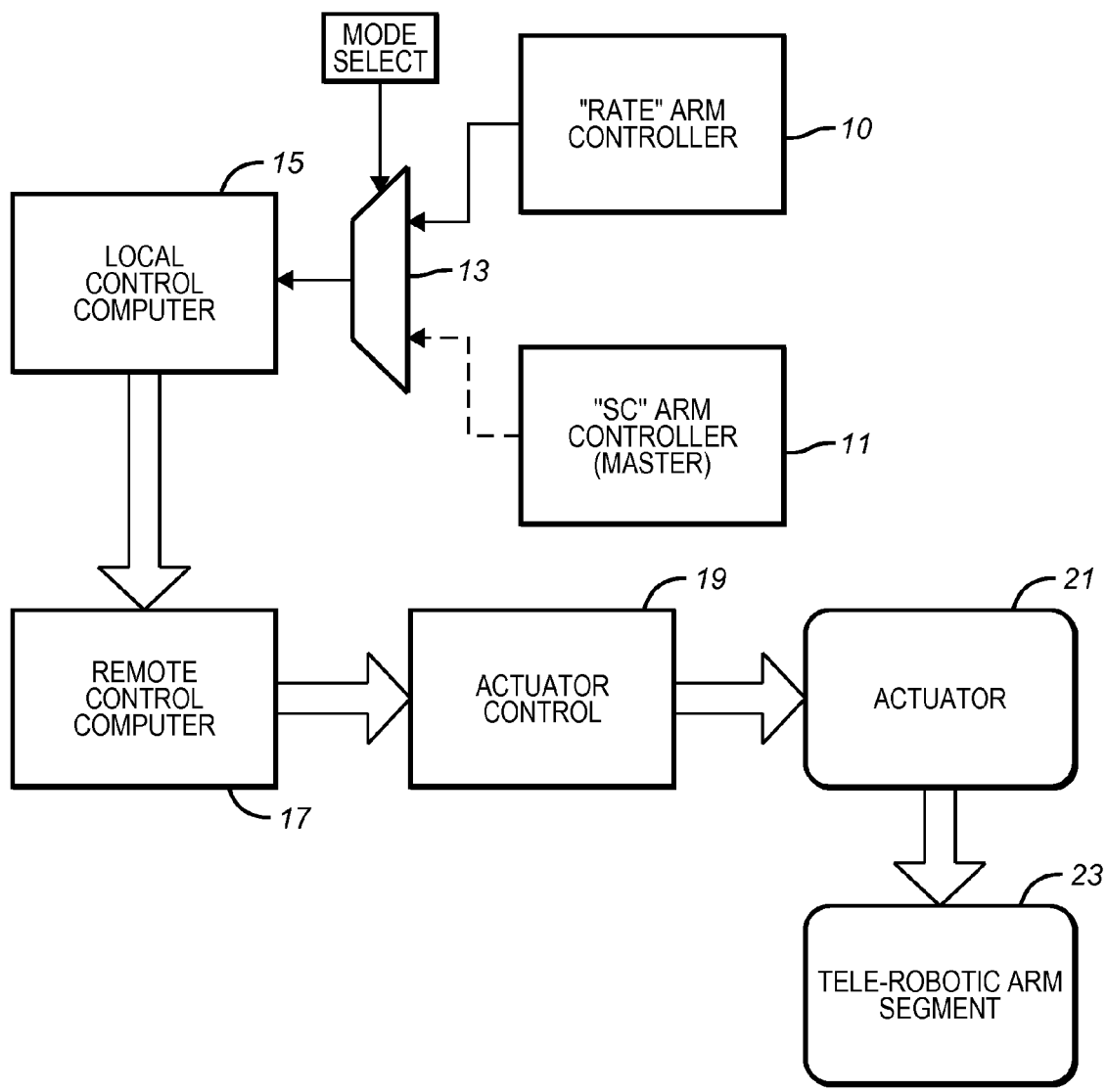
FIG. 4a is a system level diagram of a second preferred embodiment of the invention selectively operating in the rate mode.
Figure 4B:
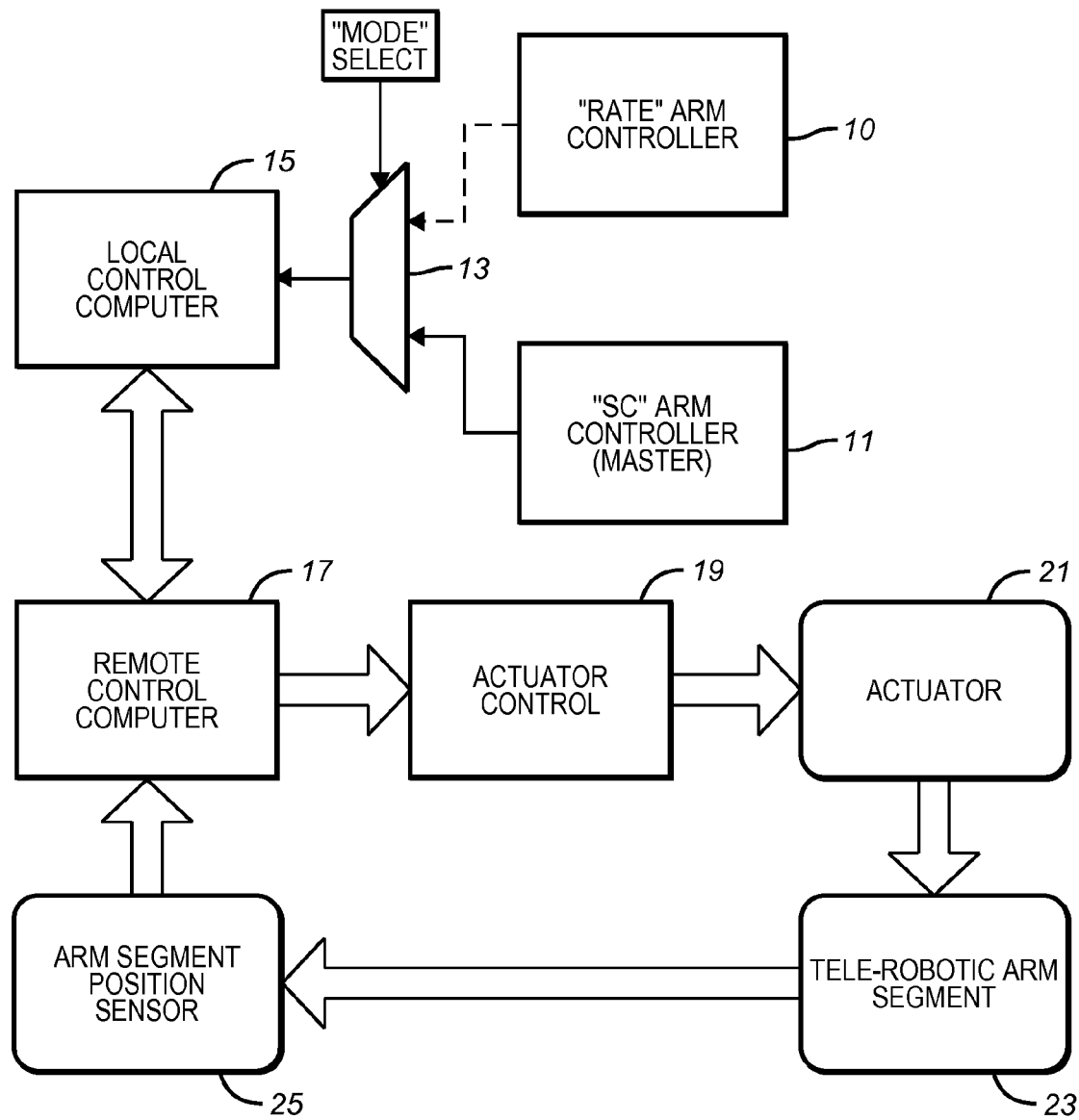
FIG. 4b is a system level diagram of a second preferred embodiment of the invention selectively operating in the SC mode.

Preferred embodiments of the invention are directed to a multi-mode manipulator arm and drive system capable of driving and/or controlling a manipulator arm in either a selected rate mode or SC mode, as shown in FIGS. 3, 4a and 4b. A preferred embodiment of the invention comprises one or more rate mode selector switches 10, each of which is configured to output a rate mode signal capable of driving a manipulator arm in a rate mode. In preferred embodiments, each rate mode selector switch is a push button or a toggle switch. In another preferred embodiment, the rate mode selector switch is operable to be placed in an open position or in a closed position by an operator. In a preferred embodiment, there is a rate mode selector switch for each joint of the manipulator arm to be controlled.

Another embodiment of the invention comprises a digital signal input 16 operatively coupled to the rate mode selector or actuation switch such that the digital signal input registers a change in the digital input signal when the rate mode actuation switch is depressed and registers the opposite digital input signal when the rate mode actuation switch is released, as shown in FIGS. 3, 4a and 4b.

A preferred embodiment of the invention further comprises a spatially correspondent controller 11 comprising a position adjustable master configured to output a spatially correspondent mode signal responsive to the position of the master and capable of driving a manipulator arm in a spatially correspondent mode, as shown in FIG. 3a. In a preferred embodiment, the spatially correspondent mode controller is a hand controller, such as a joystick. In a preferred embodiment, the master comprises a number of analog sensors equal to the number of degrees of freedom of the slave, minus one. For example the master for a seven degree of freedom manipulator would have six analog sensors. In another preferred embodiment, the master would comprise a single digital input to open and close the manipulator jaws.

A preferred embodiment of the invention further comprises a mode selector device 13 operatively coupled to selectively receive at least one of the rate mode signal and the spatially correspondent mode signal and to selectively output one of the rate mode signal or the spatially correspondent signal as the selected mode signal. In a preferred embodiment, the mode selector comprises a selector switch configured to select one of at least two inputs. In this embodiment, the selector switch can be positioned by an operator to select between the rate mode signal and the spatially correspondent mode signal. The combination of the rate mode selection switch, spatially correspondent controller, and mode selector device can be used as a multi-mode manipulator drive selection system that can be used to selectively control manipulator operations in the selected mode.

Another embodiment, the invention further comprises a local control computer 15 operatively connected to receive the selected mode signal and to output a remote control input signal. In a preferred embodiment, the local control computer is capable of transmitting the remote control input signal to a remote control computer via a wire or optical fiber. The term "computer" as used herein, encompasses a microprocessor. In a preferred embodiment, the local control computer is configured to compare the analog control signal received from the spatially correspondent controller with the position signal received from the arm segment position sensor and to produce an error correction signal determined by the magnitude of the difference between the two signals, as shown in FIG. 3. In one embodiment, this controller comprises a PID loop.

In a preferred embodiment, the invention further comprises a remote control computer 17 operatively connected to the local control computer to receive the remote control input signal and to output an actuator control input signal. In a preferred embodiment, the remote control computer is capable of receiving the remote control input signal. In another preferred embodiment, where the local control computer is involved in closed-loop control of a tele-robotic arm, it is also capable of receiving an input from the remote control computer. In some preferred embodiments, the invention is operable to control manipulators located subsea, as shown in FIGS. 3, 4a and 4b. In subsea applications, the remote control computer comprises subsea telemetry electronics and software, as shown in FIGS. 3, 4a and 4b.

In a preferred embodiment, the invention further comprises an actuator control 19 configured to receive the actuator control input signal and to output an actuator position signal, as shown in FIGS. 4a and 4b. In another preferred embodiment, where a tele-robotic arm is to be operated in a closed-loop fashion, the remote control computer is configured to receive inputs from one or more position or velocity feedback sensors. In a preferred embodiment, the actuator control is capable of acting upon desired joint position and/or velocity information, coming from the remote control computer. In an embodiment where a tele-robotic arm is moved by hydraulic actuators, the actuator control is capable of controlling the hydraulic valves which supply hydraulic pressure and flow to the hydraulic actuators.

In another preferred embodiment, the invention further comprises an actuator 21 configured to receive the actuator position signal and to move the manipulator arm segment or joint, as shown in FIGS. 4a and 4b. The term signal, as used herein, encompasses the transmission of data or other quantitative information via an electrical, electromechanical, electromagnetic, electronic, or hydraulic medium. The actuator is configured to move in response to the actuator position signal. The actuator imparts mechanical force to a respective tele-robotic arm segment 23 to change the position and/or velocity of that segment. The tele-robotic arm segment is coupled to the actuator such that it moves in response to the movement of the actuator. In an embodiment where hydraulic actuators are used, the actuator is a hydraulic cylinder or a hydraulic rotary actuator and the actuator position signal is generated in response to a predetermined level of a hydraulic process parameter, such as hydraulic pressure or flow. In another preferred embodiment, the invention comprises an arm segment position sensor 25, for each arm segment.

An embodiment of the invention further comprises a moveable manipulator arm 44 and a position sensor 45 operatively coupled to the manipulator arm and configured to output a position signal indicative of the position of the manipulator arm, as shown in FIG. 3. In another preferred embodiment, the manipulator arm comprises multiple segments, connected by multiple joints.

Another embodiment of the invention further comprises a hydraulic drive system 30 comprising a first port 32, a second port 49, a proportional control solenoid 34, and a directional control valve 36 operable to be configured in a first direction mode and a second direction mode, as shown in FIG. 3. In one preferred embodiment, the directional control valve is a 4-way, 3-position proportional valve. This hydraulic drive system is configured to receive the manipulator actuation signal from the digital signal receiver, and to receive the error correction signal from the spatially correspondent mode control system. This hydraulic drive system is further configured to eject hydraulic fluid through the first port in response to the manipulator actuation signal and the error correction signal when the proportional control solenoid is in a first configuration. In this first configuration, the hydraulic drive system receives hydraulic fluid though the second port 49.

This embodiment of the invention further comprises a first hydraulic fluid channel 31 comprising a first end 33 connected to the first port 32 and a second end 35 opposite the first end, as shown in FIG. 3. This embodiment of the invention further comprises a second hydraulic fluid channel 37 comprising a first end 39 connected to the second port 49 and a second end 38 opposite the first end, as shown in FIG. 3. When the proportional control solenoid is placed in a second configuration, the direction of hydraulic fluid flow through fluid channels 31 and 37 and through ports 32 and 49 is reversed, from the direction of such flow when the control solenoid is in a first configuration.

This embodiment of the invention further comprises a hydraulic piston 42 comprising a first port 41 connected to the second end of the first hydraulic fluid channel and a second port 43 connected to the second end of the second hydraulic fluid channel such that when the directional control valve is configured in a first direction mode, hydraulic fluid ejected from the drive system flows into the first port and out of the second port, causing the piston to extend, and when the directional control valve is configured in a second direction mode, hydraulic fluid ejected from the drive system flows into the second port and out of the first port, causing the piston to retract, as shown in FIG. 3. The piston is also connected to the manipulator arm such that extension of the piston causes movement of the manipulator arm in a first direction and retraction of the piston causes movement of the manipulator arm in a second direction.

The hybrid control scheme employed in preferred embodiments of the invention has the advantages of both the rate and SC modes. Preferred embodiments of the invention have a position feedback device for each joint and a device for modulating the flow to each actuator associated with the joint.

In a preferred embodiment, the invention uses proportional flow, directional control valves. These are a fraction of the cost of servo valves and have a lower pressure drop across them. The proportional valve is also more tolerant of contaminated oil. A proportional valve has a leakage rate that corresponds to that of simple directional control valve typically used in rate manipulators. This means that the manipulator arm joints do not drift and require continuous monitoring of position.

By employing proportional valves, specialized software, and electronics, a preferred embodiment of the invention can be switched between SC and rate modes at any time. If, while operating in SC mode, a position feedback sensor should fail, the operator can switch the manipulator from SC mode to rate mode and continue working. Alternatively, the mode can be switched back and forth as a consequence of operator preference.

There are scenarios where it would be desirable to operate some of the manipulator joints in SC mode while other joints are operated in rate mode. This would be implemented largely in software but would require that the topside control console be equipped with a means for setting operating modes for individual joints. The simplest arrangement would consist of nothing more than a toggle switch and indicator lamp (LED) for each joint.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A manipulator drive system comprising:
   a. a rate mode selector switch configured to output a rate mode drive signal capable of driving a manipulator arm in a rate mode;
   b. a spatially correspondent controller comprising a position adjustable master configured to output a spatially correspondent mode control signal responsive to the position of the master and capable of driving a manipulator arm in a spatially correspondent mode; and
   c. a mode selector device operatively coupled to selectively receive at least one of the rate mode drive signal and the spatially correspondent mode control signal and to selectively output one of the rate mode control signal or the spatially correspondent mode control signal as the selected mode control signal.

2. The drive system of claim 1, wherein the rate mode selector switch is a push button.

3. The drive system of claim 1, wherein the spatially correspondent mode controller is a hand controller.

4. The manipulator drive system of claim 1, further comprising a local control computer operatively connected to receive the selected mode control signal and to output a remote control signal.

5. The manipulator drive system of claim 4, further comprising a remote control computer operatively connected to the local control computer to receive the remote control signal and to output an actuator control input signal.

6. The manipulator drive system of claim 5, wherein the local control computer is operatively connected to the remote control computer via a wire.

7. The manipulator drive system of claim 5, wherein the local control computer is operatively connected to the remote control computer via an optical fiber.

8. The manipulator drive system of claim 7, wherein the remote control computer comprises telemetry electronics and software.

9. The manipulator drive system of claim 5, further comprising:
   a. an actuator control configured to receive the actuator control input signal and to output an actuator control output signal;
   b. an actuator configured to receive the actuator control input signal and to move in response to the actuator position signal; and
   c. a tele-robotic arm segment coupled to the actuator such that it moves in response to the movement of the actuator.

10. The manipulator drive system of claim 9, wherein the actuator is a hydraulic actuator.

11. The manipulator drive system of claim 10, wherein the actuator control signal is generated in response to a predetermined level of a hydraulic process parameter.

12. The manipulator drive system of claim 9, further comprising an arm segment position sensor configured to sense the position of a tele-robotic arm segment and to output a position indicator signal to the remote control computer.

13. A manipulator drive system comprising:
   a. a rate mode selector switch configured to output a rate mode drive signal capable of driving a manipulator arm in a rate mode;
   b. a spatially correspondent hand controller comprising a position adjustable master configured to output a spatially correspondent mode control signal responsive to the position of the master and capable of driving a manipulator arm in a spatially correspondent mode;
   c. a mode selector device operatively coupled to selectively receive at least one of the rate mode drive signal and the spatially correspondent mode control signal and to selectively output one of the rate mode control signal or the spatially correspondent mode control signal as the selected mode control signal; and
   d. a local control computer operatively connected to receive the selected mode control signal and to output a remote control signal.

14. The manipulator drive system of claim 13, further comprising a remote control computer operatively connected to the local control computer to receive the remote control signal and to output an actuator control input signal.

15. The manipulator drive system of claim 14, wherein the remote control computer comprises telemetry electronics and software.

16. The manipulator drive system of claim 15, further comprising:
   a. an actuator control configured to receive the actuator control input signal and to output an actuator control output signal;
   b. an actuator configured to receive the actuator control input signal and to move in response to the actuator position signal; and
   c. a tele-robotic arm segment coupled to the actuator such that it moves in response to the movement of the actuator.

17. The manipulator drive system of claim 16, further comprising an arm segment position sensor configured to sense the position of a tele-robotic arm segment and to output a position indicator signal to the remote control computer.

18. A manipulator drive system comprising:
   a. a rate mode selector switch configured to output a rate mode drive signal capable of driving a manipulator arm in a rate mode;
   b. a spatially correspondent hand controller comprising a position adjustable master configured to output a spatially correspondent mode control signal responsive to the position of the master and capable of driving a manipulator arm in a spatially correspondent mode;
   c. a mode selector device operatively coupled to selectively receive at least one of the rate mode drive signal and the spatially correspondent mode control signal and to selectively output one of the rate mode control signal or the spatially correspondent mode control signal as the selected mode control signal;
   d. a local control computer operatively connected to receive the selected mode control signal and to output a remote control signal; and
   e. a remote control computer comprising telemetry electronics and software and operatively connected to the local control computer to receive the remote control signal and to output an actuator control input signal.

19. The manipulator drive system of claim 18, wherein the remote control computer is operatively connected to the local control computer via an optical fiber.

20. The manipulator drive system of claim 18, wherein the remote control computer is operatively connected to the local control computer via a wire.

* * * * *